United States Patent [19]

McLemore et al.

[11] Patent Number: 4,505,380

[45] Date of Patent: Mar. 19, 1985

[54] FLUID PRESSURE OPERATED RECIPROCATING CONVEYOR

[75] Inventors: Michael McLemore; Ronald Chandler, both of Peoria, Ill.

[73] Assignee: Central Mfg., Inc., Peoria, Ill.

[21] Appl. No.: 526,006

[22] Filed: Aug. 24, 1983

[51] Int. Cl.³ .............................................. B65G 25/00
[52] U.S. Cl. .......................................... 198/750; 198/768
[58] Field of Search ................ 198/750, 761, 762, 768

[56] References Cited

U.S. PATENT DOCUMENTS 2,802,336  8/1957  Ball ................................. 198/750 X
3,547,264  12/1970  Conrad et al. ................... 198/750 X Primary Examiner—Joseph E. Valenza
Assistant Examiner—Michael Stone
Attorney, Agent, or Firm—McCaleb, Lucas & Brugman

[57] ABSTRACT

A fluid pressure operated reciprocating conveyor in the form of a pan feeder comprises a base, an elongated conveyor trough reciprocably mounted on the base, a drive cylinder connected between the base and trough, a constant volume pump, a solenoid-operated reversing valve connected between the pump and the drive cylinder to direct pressure fluid to opposite ends of the cylinder to reciprocate the trough through a stroking range in a forward stroke and in a rearward stroke at a substantially higher speed than the forward stroke. Forward and rearward limit switches connected to the reversing valve are automatically operable by the moving trough to reverse the drive cylinder at opposite ends of the stroking range. A relief valve connected to the drive cylinder is effective during the initial portion of the forward stroke to direct pressure fluid from the drive cylinder at a diminishing rate and thereby accelerate the forward stroke of the trough during that initial portion of the stroke to convey material with the trough. The reversing valve is also effective at the terminal end of the forward stroke to apply a sudden, rearward shock load on the trough to break the frictional engagement with the material and enable the material to slide forwardly while the trough is in its rearward stroke. One embodiment uses a single-rodded piston and a pump with one constant volume output. Another embodiment uses a double-rodded piston and a pump with both low and high constant volume outputs alternately applied to the cylinder during the forward and rearward strokes respectively.

13 Claims, 10 Drawing Figures

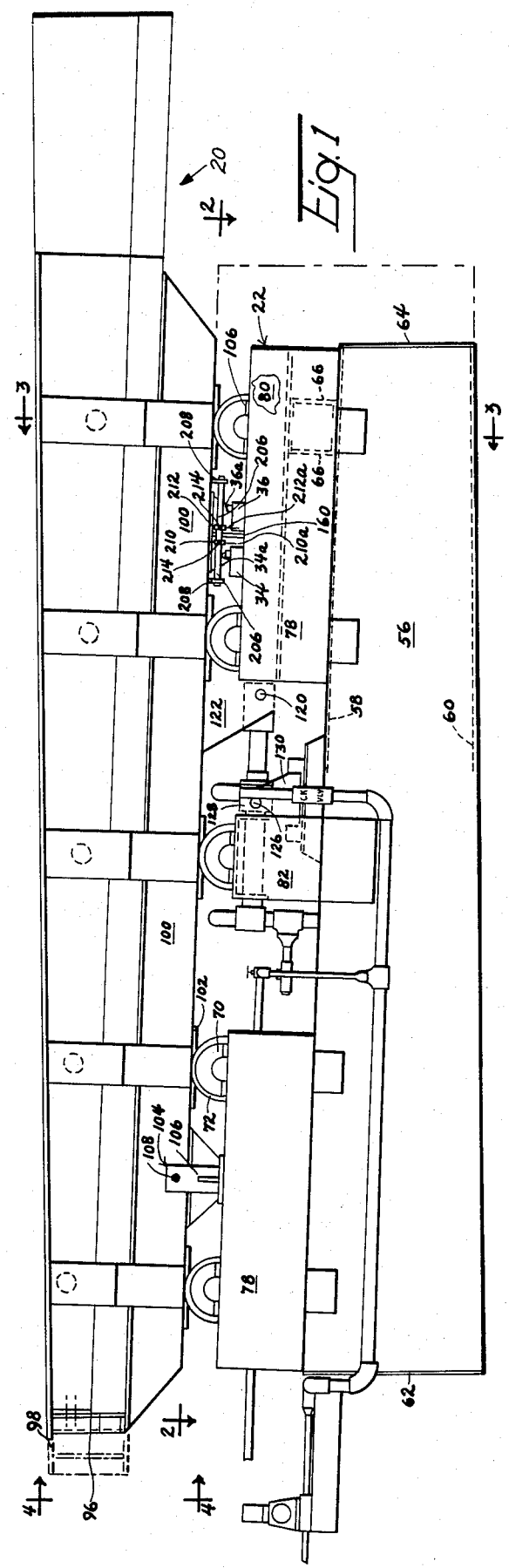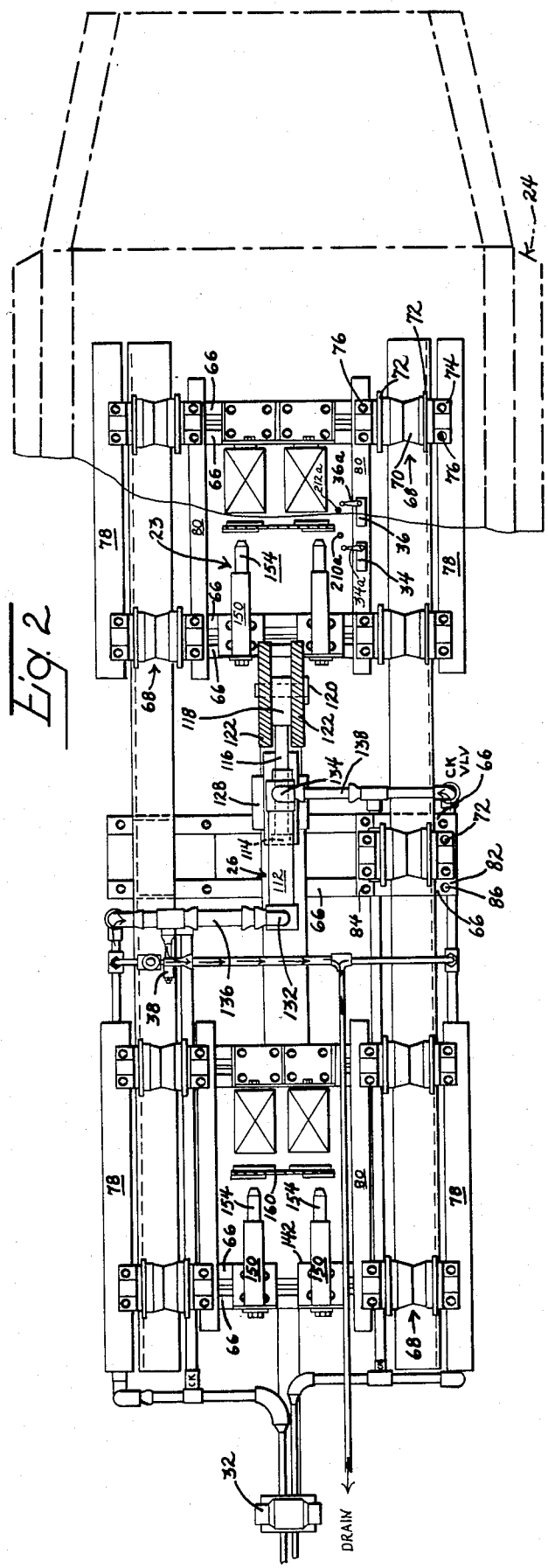

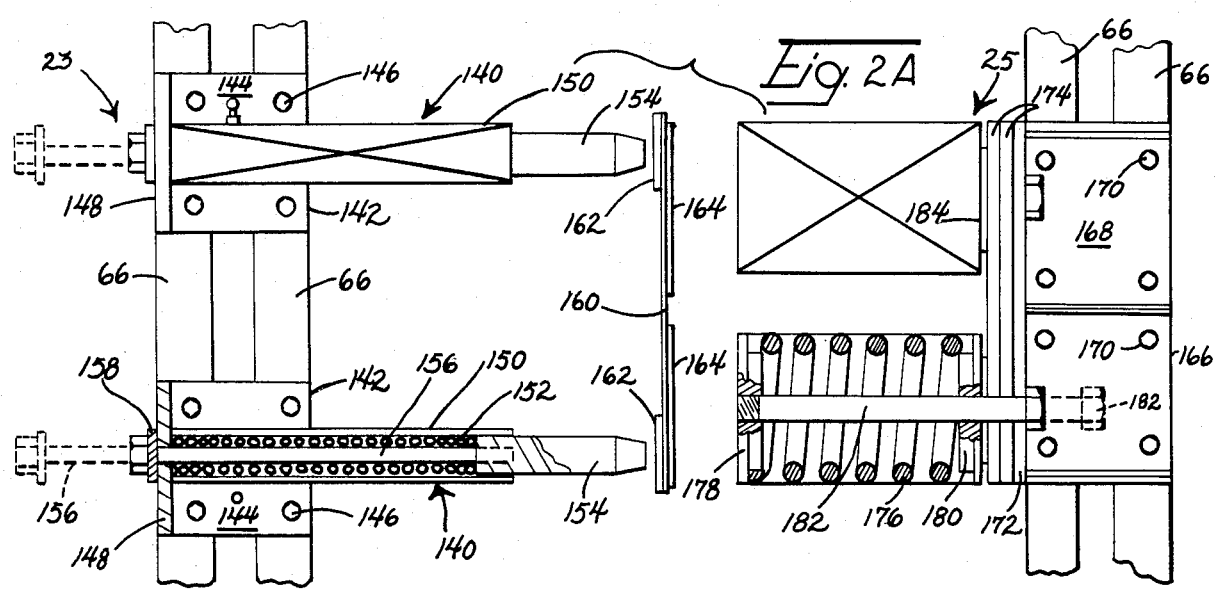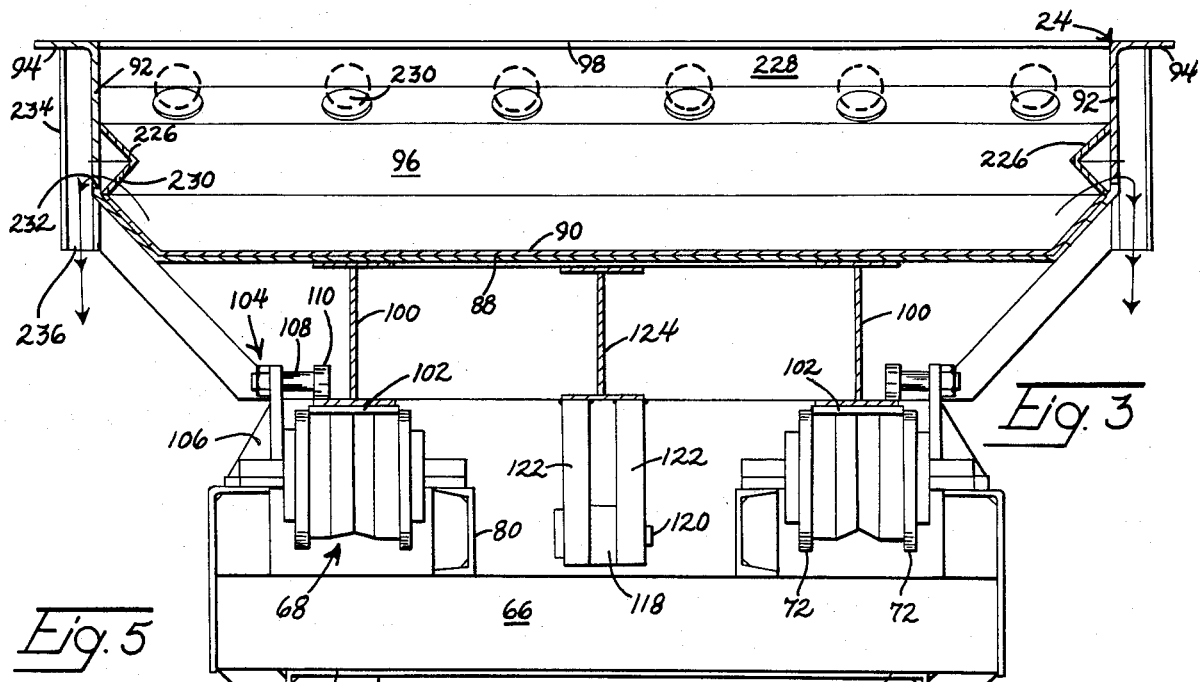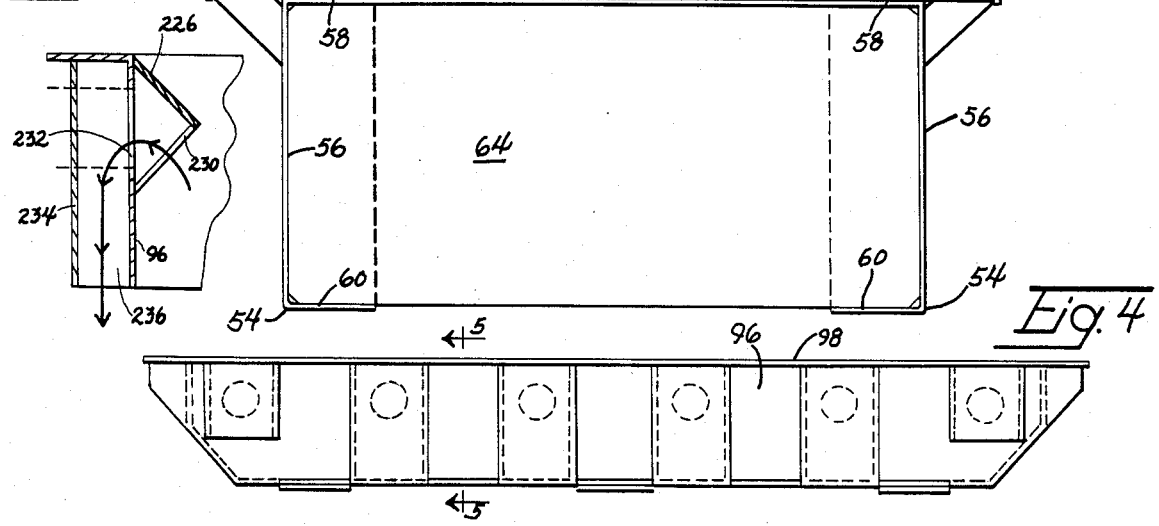

FLUID PRESSURE OPERATED RECIPROCATING CONVEYOR

BACKGROUND OF THE INVENTION

This invention relates to a reciprocating conveyor or feeder characterized by a trough or pan subjected to a differential reciprocating motion having a quick backward and a relatively slower forward stroke. The quick backward stroke causes the trough to slide under the material while the slower forward stroke moves the material along to a new position.

Such conveyors have been used extensively in mining and industrial applications where they have been known as "shaker" or "flat stroke" conveyors. The trough reciprocates back and forth in the same plane and slides material along it as contrasted with vibrating or oscillating conveyors which toss material from position to position.

Typically, these conveyors have been driven by sophisticated and costly mechanical drive mechanisms. Although rugged and reliable, they have been limitedly adaptable to different operating conditions, incapable of conveying in more than one direction, and have a non-adjustable feed rate resulting from a stroke having a fixed amplitude and frequency. There has been little success in developing a simple, low maintenance fluid pressure drive for a large reciprocating conveyor which is readily adjustable for efficiently conveying a wide variety of materials under varied conditions of temperature, density, coefficient of function, moisture, etc.

Proposals have been made to drive reciprocating conveyors by hydraulic or pneumatic fluid pressure mechanisms for the purpose of design simplicity, reversibility, and adjustability of the feed rate. These have involved driving a reciprocably mounted conveyor trough by means of a cylinder, and controls therefor have varied from alternately applying air at different pressures to opposite sides of the cylinder such as shown in Campion U.S. Pat. No. 2,473,193, to unbelievably complex arrangements of hydraulic pumps, accumulators, and variable flow control valves such as shown in J. F. Joy U.S. Pat. No. 2,662,635.

Prior to this invention, none of these fluid pressure mechanisms have been satisfactory, especially for driving large industrial conveyors or feeders.

In the simple versions, fluid pressure was alternately supplied to opposite ends of a drive cylinder with little or no control over the acceleration rates during the forward and rearward strokes. The trough would not be reversed sharply enough at the terminal end of the forward stroke to move it backwardly with sufficient snap action to completely break the friction between the material and the trough, causing some of it to move rearwardly with the trough; and the trough would change direction too sharply at the terminal end of the rearward stroke, causing some of the material to shift rearwardly on the trough. And, uncontrolled or improper movement during the forward stroke would cause the trough to "slip" beneath the material, or not move rapidly enough during at least part of the forward stroke. In the complex versions, first cost has been prohibitive and maintenance costs and down time for repair have been unacceptable.

Another problem with reciprocating conveyors used as feeders for shredded vehicles or other scrap is frequent spark-generated dust explosions which distort or destroy the trough and blow shrapnel-like fragments about the surrounding area.

In view of the foregoing, there is a need for an economically priced, simple, reliable, adjustable-feed, low-maintenance fluid pressure drive mechanism for very large reciprocating troughs or pan feeders in the order of six or more feet wide with capacities of ten or more tons of steel scrap, coal, rock, ore and the like; and there is a need for harmlessly venting the gases produced in spark-generated dust explosions in the conveyor trough.

SUMMARY OF THE INVENTION

It is a general object of the present invention to provide a fluid pressure operated reciprocating conveyor trough meeting the above needs.

Another object of the invention is to provide such a trough with a drive cylinder having opposed inlet ports connected through a reversing valve to a constant volume output pump capable of moving the trough faster in the rearward stroke than in the forward stroke and having a limit switch controlled relief valve connected to the drive cylinder effective to divert a diminishing portion of the pump output from the drive cylinder and thereby accelerate the trough at a rate controlled by the relief valve during the initial portion of the forward stroke.

Another object is to provide such a reciprocating conveyor trough in which rear shock-absorbing mechanism is engageable with the trough during the terminal end portion of the rearward stroke to prevent shock and rearward displacement of material at the rear end of the stroking range.

Another object is to provide such a reciprocating conveyor trough in which forward spring mechanism is effective to store energy during the terminal end portion of the forward stroke, and to release that stored energy into the trough and thereby assist the pressure fluid during the initial portion of the rearward stroke.

Another object is to provide such a reciprocating conveyor trough which is movable in both directions through an intermediate portion of its stroking range which is out of engagement with both the rear shock absorbing mechanism and the forward spring mechanism enabling movement of the trough during that intermediate portion of the stroking range to be responsive to the fluid pressure alone.

Another object is to provide such a trough in which the differential speed in opposite directions is obtained by using a dual mode constant volume delivery type pump connected to guide pressure fluid at different volumetric rates to opposite inlet ports of a double-rodded cylinder.

Another object is to provide such a trough in which limit switches control actuation of the reversing valve and are adjustable to vary the stroking range of the trough.

Another object is to provide such a trough which is readily capable of being reversed to convey in opposite directions.

Another object is to provide such a trough in which the expanding gases from spark-generated explosions within the conveyed material are guided harmlessly outside of the trough.

BRIEF DESCRIPTION OF THE DRAWINGS

Other objects and advantages will be apparent from the following description taken in connection with the accompanying drawings in which:

FIG. 1 is a side elevational view of a fluid pressure operated reciprocating conveyor in the form of a pan feeder illustrating one form of the present invention;

FIG. 2 is a horizontal sectional view of FIG. 1 taken along line 2—2 with portions of the overlying trough or feeder pan shown in phantom lines;

FIG. 2A is a fragmentary enlarged view of FIG. 2;

FIG. 3 is a vertical sectional view of FIG. 1 taken along line 3—3;

FIG. 4 is a fragmentary end view of FIG. 1 taken in the direction of the arrows 4—4;

FIG. 5 is a fragmentary enlarged view of FIG. 4 taken along line 5—5;

Like parts are referred to by like reference characters.

DETAILED DESCRIPTION OF THE PREFERRED EMBODIMENT

Figure 6:
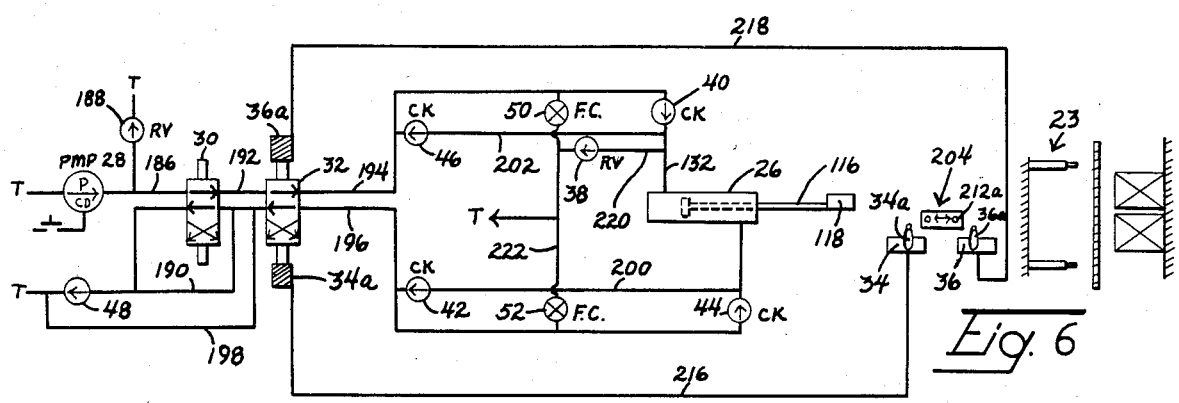
FIG. 6 is a schematic diagram of a hydraulic drive and control circuit for the apparatus shown in the previous figures.

Referring now in more detail to the invention shown in the drawings, a fluid operated reciprocating conveyor generally designated 20 comprises a stationary base 22, an elongated trough or conveyor deck 24, drive cylinder mechanism 26, shock absorbing mechanism 23, forward spring mechanism 25, a pump 28, a main control valve 30, a reversing valve 32, limit mechanism including a pair of limit switches 34 and 36, a relief valve 38, check valves 40, 42, 44, 46 and 48, and flow control valves 50 and 52, all interconnected for cooperation as will now be described.

The base 22 comprises a pair of transversely spaced ground-engaging side walls 54, 54, each being a channel member with a vertical web 56 and upper and lower flanges 58 and 60. The upper flanges 58 are forwardly and downwardly inclined to establish a slight gradient for the trough. The side walls 54 are interconnected by opposite end walls 62, 64. Horizontal cross beams 66, 66 (FIGS. 2 and 3), arranged in pairs, are affixed as by welding across the top flanges 58 of side walls 54, 54.

As best shown in FIG. 2, five pairs of equally spaced roller assemblies 68, are provided to support the trough or deck 24 for back and forth reciprocating motion. Each assembly includes a roller 70 with spaced apart flanges 72 and a bearing member 74 in which it is rotatably journaled. Two pairs of these roller assemblies are fastened by bolts 76 to pairs of longitudinal stringers 78 and 80 in each front and rear corner area of the base. Each pair of these stringers extend from one pair of cross beams 66, 66 to an adjacent pair, and are fixed to them by welding. At the center of the base, across a transverse center line, a pair of center roller assemblies are fastened by bolts 76 to pairs of relatively short longitudinal stringers 82 and 84 which in turn are fastened as by bolts 86 across the center pair of cross beams 66.

As shown in FIG. 3, the trough or conveyor deck 24 is generally U-shaped in cross section with a bottom wall 88 having a replaceable liner 90, two side walls 92, 92 with outwardly extending top flanges 94 and a rear wall 96 with a top flange 98.

A pair of I-beams 100, 100 fastened to the underside of the trough provide a double "back bone" for strength and rigidity. Wear strips 102 are bolted to the bottoms of the I-beams and provide replaceable rolling surfaces engageable with the rollers 70. The wear strips are dimensioned to fit between the roller flanges 72, 72.

As best shown in FIGS. 1 and 3, there is at least one hold down assembly 104 on each side of the trough. Each comprises a bracket 106 fastened to the top of a stringer 78. Each has an inwardly extending shaft 108 with a roller 110 engaging the lower flange of a corresponding I-beam 100. While only one pair is illustrated, at the rear end of the trough, an additional pair may be used at the front end. These limit vertical movement of the trough enabling it to move forward and backward in a flat plane.

Drive cylinder mechanism 26 shown in FIG. 2 includes a cylinder 112, a piston 114 and a single piston rod 116 extending forwardly through the cylinder casing, terminating in a knuckle 118. This is pivotally connected by means of pin 120 between a pair of braces 122 welded to the bottom of a longitudinal stringer 124 fastened to the bottom of the trough as best shown in FIG. 3.

As shown in FIG. 1, the cylinder casing is pivotally connected by pins 126 between a pair of braces 128 which are mounted by means of a bracket 130 across the top flanges 58 in the base 22. This pivotal arrangement enables the cylinder to rock slightly up and down as needed to accommodate any vertical misalignments between the cylinder and the drive connecting pin 120 at the bottom of the trough. Conduits 132 and 134 at the head and rod ends respectively of the cylinder include flexible hose sections 136 and 138 to accommodate any such movement of the cylinder and prevent binding.

As shown in FIGS. 2 and 2A, shock absorbing mechanism 23 engages the trough in the terminal end portion of its rearward stroke to prevent slamming which would cause rearward displacement of conveyed material at the rear end of the stroking range. A wide variety of shock absorbing mechanisms may be employed, in this case it is shown as a pair of snubbers 140, 140 at each end of the base. Each snubber comprises a mounting bracket 142 with a bottom plate 144 fastened by bolts 146 to a pair of cross beams 66, a vertical plate 148, and a guide tube 150. A coil snubber spring 152 is compressibly interposed between vertical plate 148 and a pusher shaft 154 slidably assembled within the tube. A long bolt 156 with a washer 158 welded beneath the head is slidable within a hole in plate 148 and is threadedly engaged with the pusher shaft.

A wide variety of shock absorbing mechanisms may be used other than the specific spring type shown. Hydraulic, pneumatic or compressible rubber shock absorbers, or a combination thereof, may be used.

Two transverse vertical plates 160 (FIGS. 1 and 2) extend downwardly from the underside of the trough and provide operating engagement with the rear shock absorbing mechanism 23, and also with the forward spring mechanism to be described. Impact pads 162, 162 and 164, 164 are provided on opposite sides of the plate for engagement with mechanisms 23 and 25.

As shown in FIGS. 2 and 2A, forward spring mechanism 25 engages the trough through the plates 160 during the terminal end portion of the forward stroke to thereby store energy for release during the initial portion of the return stroke. As will be seen, this assists the pressure fluid in abruptly reversing the trough motion to release the conveyed material for continued forward sliding movement while the trough slips rearwardly beneath it. In this case, the forward spring mechanism is shown as a compression spring unit at each end of the base. Each compression spring unit comprises a mounting bracket 166 with a bottom plate 168 fastened by bolts 170 to a pair of cross beams 66, a vertical plate 172, and one or more shim plates 174, 174. A pair of heavy coil springs 176 are compressibly interposed between retainer disks 178 and 180. A long bolt 182 is slidable within holes in vertical plate 172 and shim plates 174 and is threadedly engaged with the rear end disk 178. A fiber washer 184 is placed between each forward spring disk 180 and the adjacent shim plate 174 to provide a slight cushion and minimize a possible source of noise. Impact of the rear disks 178 is absorbed by pads 164.

In operation, where the full stroking range of the trough is 9", the pusher shafts 154 engage the pads 162 on plates 160 and the springs 152 are compressed during the terminal 4½" of the rearward stroke, causing the bolts 156 to extend behind the mounting brackets 142 as shown in broken lines in FIG. 2A. Similarly, the front springs 176 engage the pads 164 on plates 160 and are compressed during the terminal 1½" of the forward stroke causing the bolts 182 to extend forwardly beyond the mounting brackets 166 as shown in broken lines in FIG. 2A.

The pump 28 may be any constant discharge output type having adequate capacity for the stroking requirements of the drive cylinder 26. Where used with hydraulic oil, or other liquid, which is practically incompressible, there is a fixed and mathematically determinable relationship between the volumetric flow rate from the pump and the lineal speed of the trough. For example, using the pump and cylinder parameters developed for one specific prototype of this invention, the cylinder 112 has a 3.25" diameter piston with a 2" diameter rod and the pump has a flow rate of 40.6 gallons per minute. Where this flow rate is applied to the head end of the cylinder (8.29 square inches), the piston and trough move forwardly at 94 feet per minute. Where it is applied to the smaller area (5.15 square inches) at the rod end, they move rearwardly at 152 feet per minute, approximately 60% faster. Thus, utilizing a single-rodded cylinder, any selected speed ratio between the rearward and forward strokes can be obtained by the simple expedient of selecting the appropriate piston and rod diameters.

Referring now to the hydraulic drive and control circuit shown in FIG. 6, the pump 28 draws hydraulic fluid from a tank T and directs it to main control valve 30 through a conduit 186. A relief valve 188 protects the pump against the overpressures. The valve 30 is operable between "on" and "off" positions and a wide range of valves are suitable for that purpose. In the present case, in the "off" position, conduit 186 is connected to conduit 190 and returns the pumped fluid direct to the tank through check valve 48, bypassing the drive cylinder 26. In the "on" position, shown in FIG. 6, pressure fluid is directed through conduit 192 to reversing valve 32.

Figure 7:
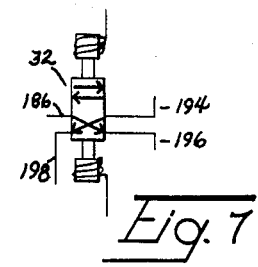
FIG. 7 is a fragmentary view of FIG. 6 showing the reversing valve in an alternate position.

Reversing valve 32 has two positions: a first position shown in FIG. 6 directing pressure fluid from conduit 192 to the head end of the cylinder through conduit 194, and exhausting the rod end of the cylinder through conduit 196 to tank via conduit 198; and a second position shown in FIG. 7 exhausting the rod end of the cylinder through conduit 196 and to tank via conduit 198. In the first position, pressure fluid is directed through check valve 40 and head end conduit 132 into the head end of the cylinder moving the trough forwardly while fluid from the rod end returns to tank through return conduit 200 and check valve 42. In the second position, pressure fluid is directed through check valve 44 and rod end conduit 134 to move the trough rearwardly while fluid from the head end is exhausted to tank through return conduit 202 and check valve 46.

Limit means, generally designated 204, is connected to the trough and base and is trippable at opposite ends of the trough stroking range to automatically actuate the reversing valve 32 and reverse the motion of the trough. In the present case, this comprises the rearward and forward limit switches 34 and 36 respectively suitably mounted on the top surface of one of the stringers 78 as shown in FIG. 1. A longitudinal slide shaft 206 is mounted by end hangers 208 to the underside of the one of the I-beams 100. Adjustment rings 210, 212 are slidably positioned along the shaft and held in selected positions by set screws 214. The adjustment rings have downwardly extending trip fingers 210a and 212a respectively engageable with actuating arms 34a and 36a on switches 34 and 36 attached to one of the longitudinal stringers 80. As schematically illustrated by conductors 216 and 218, limit switches 34 and 36 are operatively connected with solenoids 34a and 36a at opposite ends of the reversing valve 32. Rearward movement of the trough causing finger 210a to trip switch 34 actuates solenoid 34a to shift the reversing valve 32 to its FIG. 6 position and start the drive cylinder in its forward stroke. Likewise, forward movement of the trough causing finger 212a to trip switch 36 actuates solenoid 36a to shift the reversing valve to its FIG. 7 position and start the drive cylinder in its rearward stroke. The positions of the trip fingers 210a and 212a can be changed by moving the adjustment rings 210 and 212 on the shaft 206 and locking them in place by re-setting screws 214. This adjusts the amplitude of the trough stroke and its position with respect to the stroking range of the cylinder.

An important part of the invention is the special relief valve 38. This is located in conduit 220 and is connected between the cylinder head conduit 132 and tank conduit 222. Relief valve 38 is a direct operated pop-off type relief valve which opens wide at a predetermined pressure setting, and immediately starts to close, fully closing in about 0.2 seconds during which time it diverts a diminishing volume of fluid from the head end conduit 132 to tank, gradually and controllably accelerating the trough during that short time interval. This provides a very simple, yet effective means for avoiding a sudden, massive, slamming reversal of forces on the trough which would break the frictional engagement between the trough and the material at the instant the forward stroke begins. The controlled acceleration during the approximately 0.2 seconds that it takes the valve 32 to close enables the trough to bring the material up to speed without slipping beneath it during the forward stroke.

Pump 28 is of the constant volume output type, for example a gear or piston pump. By pumping hydraulic oil, or other suitable hydraulic liquid, which for all practical purposes is incompressible, the speed of the piston rod and conveyor deck is determined by the effective piston area. As pointed out above, by using an incompressible fluid, the lineal speed of the trough in both directions can be determined by the volumetric output of the pump and the cylinder and piston rod diameters.

Figure 9:
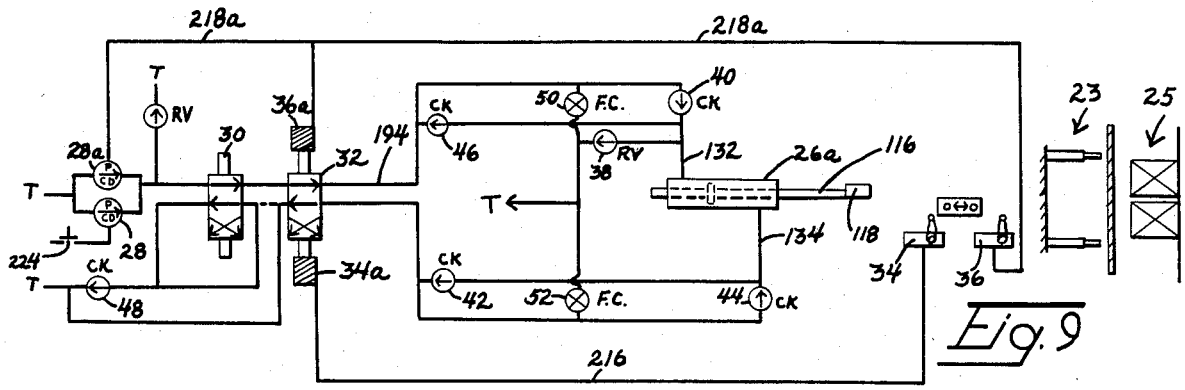
FIG. 9 is a schematic diagram of a hydraulic drive and control circuit for an alternate form of the invention.

Another way of driving the trough is shown in FIG. 9. This is a schematic diagram similar to FIG. 6 except that a cylinder mechanism 26a having a double-rodded piston has been substituted for the single-rodded arrangement shown in FIG. 6; thus, the effective piston areas are the same in both directions. And a second constant discharge pump 28a has been added in parallel with pump 28 and is automatically actuated by limit switch 36 through conductor 218a by limit switch 36 to add an extra volume of pressure fluid to conduit 196 during the rearward stroke.

While FIG. 9 illustrates, for simplicity, two separate pumps 28 and 28a, with pump 28 energized through a switch 224, and 28a energized through conductor 218a, a conventional multiple piston pump (not shown) with its output rate controlled by the adjustment of a conventional swash plate, may be substituted for the combination of pumps 28 and 28a. In that case, the pump would automatically increase its output rate in response to actuation by limit switch 36 which would change the angle of the swash plate and call for increased output.

Referring to FIGS. 2, 3 and 6, flow control valves 50 and 52 are connected from pressure conduits 194 and 196, to tank conduit 222. These are optional, not absolutely necessary for operation of the system, but provide means for modifying the stroking range in both directions for optimum performance in conveying different materials.

Although not specifically illustrated, this system is readily convertible for conveying in opposite directions simply by connecting relief valve 38 to rod end conduit 134 and reversing the positions of the rear shock absorber and front spring mechanisms 23 and 25.

A wide variety of components may be used in the system. In one heavy duty mill conveyor built for feeding comminuted automobile scrap and which has provided an excellent working example of the invention, specifications of performance and certain of the major components are as follows:

| | |
|---|---|
| Deck Weight Static | 7,500 lbs. |
| Strokes/Min. | 70 |
| Flow Rate (Shredded Scrap) | 25.5 Ft./Min. |
| Material Movement Per Stroke | 4.78 In. |
| Horsepower Required | 25 |
| Pressure to run | 1,000 PSI |
| Gallon/Min. | 40.6 |
| Cylinder Required | 3¼" Dia., with 2" Dia. Rod |
| Deck Stroke | 9 In |
| Total Deck Capacity | 225,000 lbs |
| Spring Load Rear | 1,280 lbs. (Max.) |
| Spring Load Front | 5,400 lbs. (Max.) |
| Deck Material Velocity Difference | 52 Ft./Sec. |
| Cylinder 26 | Parker No. 3.25DVH28X12.00 |
| Reversing Valve 32 | Parker No. D63WID120Y |
| Relief Valve 38 | Parker No. RA1200-S3 |

-continued

| | |
|---|---|
| | Direct Operated Relief Valve |
| Flow control valves 50 and 52 were Parker No. MV1200S and MV800S respectively. | |
| (Above Parker items supplied by Parker Hannifin Corporation, Cleveland, Ohio) | |
| The front springs 176 and rear springs 152 were Central No. 375 and Lamina No. M58A Springs obtained from Central Mfg. Co., Peoria, Illinois | |

Use and operation will now be described for a complete reciprocal stroking cycle consisting of a forward and a rearward stroke, assuming 500 pounds per square inch hydraulic fluid pressure at the drive cylinder ports 132 and 134, and assuming the acceleration-controlling relief valve 38 is set to open at a pressure slightly above that.

Figure 8:
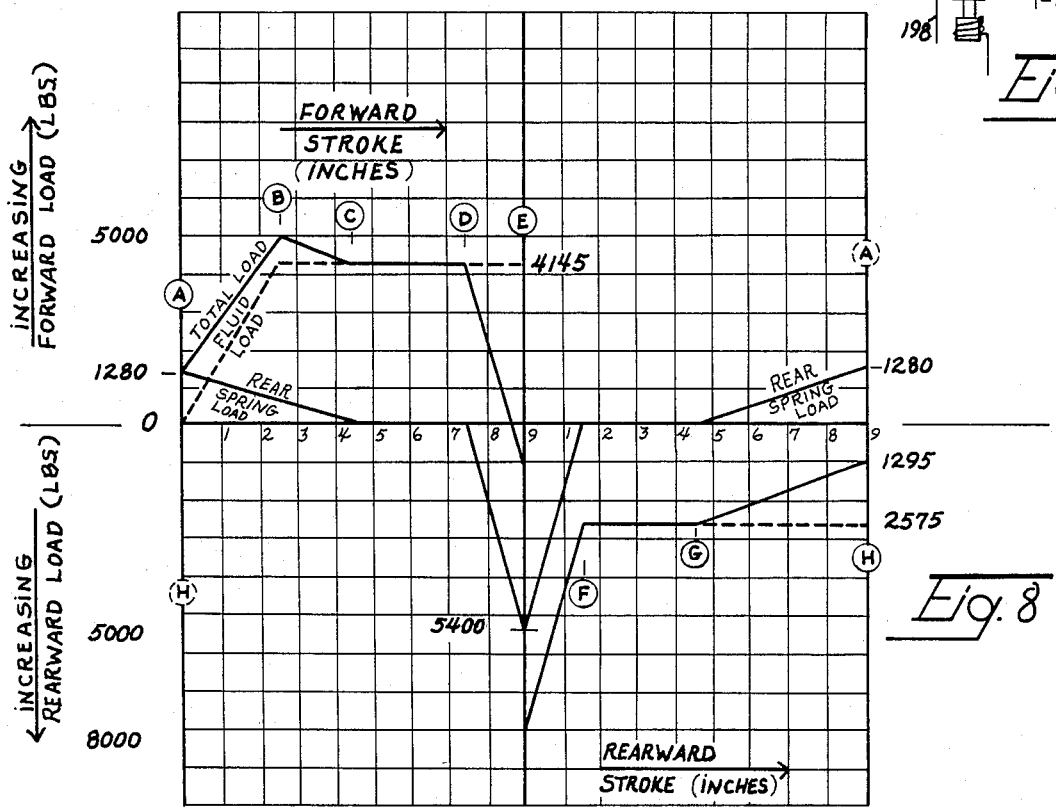
FIG. 8 is a load-displacement curve showing the loads applied to the reciprocable trough or deck during various portions of a complete forward and backward reciprocating cycle.

In FIG. 8, the load applied by the rear and front springs 152 and 176, and the fluid pressure load exerted by the drive cylinder, and their resultant total load applied to the deck 24 are plotted for a complete forward and rearward stroking cycle having a total 9" amplitude.

The loads applied to the deck during the forward stroke are plotted from points A to E in FIG. 8. The loads applied during the rearward stroke are plotted from points E to H. The deck position at A at the beginning of the forward stroke is, of course, the same as its position at H at the end of the rearward stroke and this is so indicated in FIG. 8. Forward loads are above the horizontal line and rearward loads are below it.

Referring first to the spring loads on the deck, at point A, rear springs 152 are compressed a full 4½", exerting a total forward load of 1,280 lbs. At point C (4½" forwardly from A, and half-way through the forward stroke), the rear spring compression has dropped to 0. For the next 3", from C to D, neither the rear springs nor the front springs engage the deck; only fluid pressure is effective in this intermediate zone. At D, the deck engages the front springs which are fully compressed during the terminal 1½" of the forward stroke. At E, front springs 176 exert a maximum 5,400 lb. rearward load. AT E, 9" from A, where the deck starts to move rearwardly, transferring the stored energy in the front springs into the deck during the next 1½". At F, the front springs are fully disengaged. For the next 3", from F to G, the deck is again out of engagement with either the front or rear springs and is moved only by fluid pressure. At G, and for the remaining 4½" of the rearward stroke, the rear springs are compressed to the point H where they exert the 1,280 lb. total forward load referred to in the first part of this paragraph. This completes the reciprocal cycle.

Referring now to the fluid pressure loads during this same reciprocal cycle, when limit switch 34 is actuated at the terminal end of the rearward stroke, it energizes solenoid 34a to shift reversing valve 32 from its FIG. 7 to its FIG. 6 position. This suddenly changes the direction of pressure fluid from rod inlet conduit 134 to head inlet conduit 132. The resultant hydraulic shock coupled with a transient pressure rise in conduit 220 initially opens relief valve 38 wide. It then closes during the next approximately 0.2 seconds. During that time, the deck moves approximately 2-3" before relief valve 38 completely closes at about point B in FIG. 8. The "FLUID LOAD" line in FIG. 8, from A to B, illustrates generally how the relief valve 38 diverts a diminishing portion of the output of pump 28 from the head end of the drive cylinder 112 during the initial portion of the forward stroke (from A to B) to thereby provide an increasing flow of fluid into the cylinder and accelerate the deck during this initial 2-3" portion of the forward stroke. From B to E, the forward fluid load is 4,145 lbs.; in the intermediate zone from C to D, when both the rear and front springs are disengaged from the deck, the sole forward propelling force is the fluid pressure. At E, there is an intentionally sudden and direct change in the fluid pressure load when forward limit switch 36 is tripped. This energizes solenoid 36a to move reversing valve 32 instantaneously to its FIG. 7 position. This suddenly directs the pump output from the rear cylinder conduit 132 to the front conduit 134. As shown in FIG. 8, the fluid pressure load on the cylinder then instantaneously changes from 4,145 lbs. forwardly to 2,575 lbs. rearwardly. This reversal of fluid load is not cushioned in any way, as is done with relief valve 38 at the rear end of the stroke, and thereby applies maximum rearward shock load to the deck to break loose the frictional engagement of the trough with the material conveyed. This enables it to slide forwardly during the ensuing rearward stroke. To further enhance the frictional break-up, approximately 60% less piston area at the rod end, causes the deck to shift rearwardly approximately 60% faster than in the forward stroke. From F to H during the rearward stroke, the pressure load is a constant 2,575 lbs.

The overall effect of the above-described spring and fluid loads on the conveyor deck 24 is additive. The resultant total which is "felt" by the deck is indicated by the line marked "TOTAL LOAD" in FIG. 8.

Following this "TOTAL LOAD" line from A to H, it will be seen that the forward load gradually increases during about the first 2½" of forward stroke from A to B, increasing from 1,280 lbs. to 5,000 lbs. From B to C, the forward load drops to 4,145 lbs. and continues at that level to D where the front springs begin to neutralize the fluid pressure load. Between D and E, during the terminal 1½" of the forward stroke, the "TOTAL LOAD" suddenly changes to a full 8,000 lbs. in the rearward direction. Thus, from D to E, there is a sudden, overall reversal of forces comprising a change of over 12,000 lbs. The stored load in the forward springs and the fluid pressure load augment one another. As this reversal occurs, the energy stored in the front springs is transferred back into the deck during the first 1½" of the rearward stroke, from E to F. Between F and G, the intermediate zone disengaged from the springs, rearward total force is a constant 2,575 lbs. From G to H the rear shock absorber springs 152 compress and partially counteract the fluid pressure load, reducing the total rearward load to 1,295 lbs. at H, the terminal end of the rearward stroke. At H, there is a relatively small load reversal of only 2,575 lbs., from 1,295 lbs. rearwardly to 1,280 lbs. forwardly, when reversing valve 32 is restored to the FIG. 6 position.

This relatively small load reversal at the end of the rearward stroke, and the controlled forward acceleration resulting from the relief valve 38 provides a simple yet very effective way of preventing shock and rearward movement of the material between the rearward and forward strokes.

Another important feature of the invention is the provision of explosion diversion channels best shown in FIGS. 3 and 5.

One of the serious hazards of using a heavy duty scrap feeder in dusty environments, where it is used to feed scrap such as shredded automobile parts and the like, is the creation of dust and sparks resulting in frequent spark-generated dust explosions. In spite of extremely heavy, reinforced plate construction, these explosions can warp and distort the conveying trough and blow shrapnel-like pieces of material around the area creating a hazard to personnel and equipment. Explosion-induced warpage of the trough can be severe enough to require premature replacement or rebuilding of an entire trough.

To combat this problem and divert explosive forces harmlessly out of the trough, channel members 226 and 228 comprising lengths of angle iron are welded along the side walls 92 and rear wall 96 (FIG. 3). Along the bottom halves of these channels are a plurality of openings 230 in direct communication with the interior of the trough. Along the side and rear walls (FIGS. 3 and 5), there are additional openings 232, each discharging into a vertical tube section 234 having a closed top and an open bottom vent 236. Thus, in event of an explosion within the mass of conveyed material on the trough, the expanding explosion gases will be diverted outwardly and downwardly in the directions of the arrows shown in FIGS. 3 and 5, without applying destructive forces to the trough and without blowing pieces of the conveyed material dangerously about the area. The explosive gases will be dissipated downwardly, harmlessly alongside the trough.

The embodiments described and shown to illustrate the present invention have been necessarily specific for purposes of illustration. Alterations, extensions and modifications would be apparent to those skilled in the art.

The embodiments of the invention in which an exclusive property or privilege is claimed and defined as follows:

1. A fluid pressure operated reciprocating conveyor comprising:
   a base;
   an elongated conveyor trough reciprocably mounted on the base;
   drive cylinder means connected to the trough having opposed inlet ports alternately pressurizable to reciprocate the trough through a stroking range in forward and rearward strokes;
   constant volume output pump means;
   reversing valve means connected between the pump means and the inlet ports and actuatable between opposite positions to direct pressure fluid from the pump means alternately to said inlet ports;
   means enabling the output pressure fluid from the pump means to move the trough substantially faster in the rearward stroke than in the forward stroke;
   limit means associated with the trough and trippable thereby at the terminal ends of the forward and rearward strokes to actuate the valve means and alternate the inlet port pressurized by the pump to thereby reverse direction of the trough; and
   relief valve means connected to the drive cylinder means and effective to divert a diminishing portion of the output of the pump means from the drive cylinder means during an initial portion of the forward stroke to thereby provide an increasing flow of fluid into the cylinder means and accelerate the trough during the initial portion of the forward stroke.

2. A fluid pressure operated reciprocating conveyor according to claim 1 in which rear shock absorbing means is engageable with the trough during the terminal end portion of the rearward stroke to thereby prevent shock and resulting rearward displacement of material at the rear end of the stroking range.

3. A fluid pressure operated reciprocating conveyor according to claim 2 in which said shock absorbing means includes rear spring means engageable with the trough to store energy during the terminal end portion of the rearward stroke.

4. A fluid pressure operated reciprocating conveyor according to claim 1 in which forward spring means is engageable with the trough to store energy during the terminal end portion of the forward stroke.

5. A fluid pressure operated reciprocating conveyor according to claim 4 which is effective following reversal of the valve means at the terminal end portion of the forward stroke to release the stored energy in the forward spring means to assist the pressure fluid in reversing the direction of movement of the trough during the initial portion of the rearward stroke.

6. A fluid pressure operated reciprocating conveyor according to claim 1 in which rear shock absorbing means is engageable with the trough during the terminal end portion of the rearward stroke and forward spring means is engageable with the trough during the terminal end portion of the forward stroke to thereby prevent shock and rearward displacement of material conveyed at the terminal end portion of the rearward stroke and to assist the pressure fluid in moving the trough during the initial end portion of the return stroke.

7. A fluid pressure operated reciprocating conveyor according to claim 6 in which the trough is movable in both directions in the stroking range through an intermediate range out of engagement with both the rear shock absorbing means and the forward spring means, whereby pressure fluid from the pump means is the sole moving force for the trough in the intermediate range.

8. A fluid pressure operated reciprocating conveyor according to claim 1 in which said drive cylinder means has a piston with a single rod extending from one end connected to the trough, the head end of the cylinder means being the rearward end receiving pressure fluid to move the trough in the forward direction, and the rod end of the cylinder means being the forward end receiving pressure fluid to move the trough in the rearward direction.

9. A fluid pressure operated reciprocating conveyor according to claim 1 in which said pump means is of the constant volume delivery type energizable in a first mode to deliver fluid at one delivery rate and energizable in a second mode to deliver fluid at an increased delivery rate, said cylinder means having a double-rodded piston connected to the trough, means responsive to actuation of the valve means to deliver pressure fluid to the rearward end of the cylinder means at said one delivery rate to move said trough forwardly at a speed determined by said one delivery rate, and means responsive to actuation of the valve means to deliver pressure fluid to the forward end of the cylinder means at said increased delivery rate to move said trough forwardly at a speed determined by said increased delivery rate.

10. A fluid pressure operated reciprocating conveyor according to claim 1 in which the reversal of pressure fluid at the terminal end of the forward stroke is abrupt and unrelieved to maximize the rearward shock load on the trough and break the frictional engagement thereof with the conveyed material enabling the material to slide forwardly as the trough is being moved rearwardly.

11. A fluid pressure operated reciprocating conveyor according to claim 1 in which outlet flow control valve means are connected to the opposed inlet ports of the drive cylinder means and are selectively operable to divert pressure fluid from said inlet ports to modify the stroking rate of the cylinder means.

12. A fluid pressure operated reciprocating conveyor according to claim 1 in which said limit means includes a pair of limit switches, means for actuating said limit switches at opposite ends of said stroking range, and said reversing valve means including solenoid means for actuating said reversing valve means between the said opposite positions in respons to alternate actuation of said limit switches.

13. A fluid pressure operated reciprocating conveyor according to claim 12 in which said limit switches are adjustable to vary the spacing therebetween and thereby adjust the size of said stroking range.

* * * * *